(12) United States Patent
Fouquet et al.

(10) Patent No.: US 6,912,335 B2
(45) Date of Patent: Jun. 28, 2005

(54) OPTICAL SWITCH WITH REDUCED BEAM DIVERGENCE

(75) Inventors: Julie E. Fouquet, Portola Valley, CA (US); Charles D. Hoke, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 208 days.

(21) Appl. No.: 10/339,922

(22) Filed: Jan. 10, 2003

(65) Prior Publication Data

US 2004/0136644 A1 Jul. 15, 2004

(51) Int. Cl.[7] ............... G02B 6/26; G02B 6/35; G02B 26/00
(52) U.S. Cl. ............... 385/18; 385/147; 359/320
(58) Field of Search ............... 385/14–18, 129–133, 385/147; 359/320, 244

(56) References Cited

U.S. PATENT DOCUMENTS

| 5,848,211 | A | | 12/1998 | Yang et al. | |
|---|---|---|---|---|---|
| 6,215,222 | B1 | | 4/2001 | Hoen | |
| 6,567,206 | B1 | * | 5/2003 | Minardi et al. | 359/320 |
| 6,810,160 | B2 | * | 10/2004 | Sugama et al. | 385/14 |
| 2002/0118907 | A1 | * | 8/2002 | Sugama et al. | 385/14 |
| 2004/0136644 | A1 | * | 7/2004 | Fouquet et al. | 385/18 |

FOREIGN PATENT DOCUMENTS

| EP | 0826995 A1 | 3/1998 |
|---|---|---|
| EP | 1041707 A2 | 10/2000 |

OTHER PUBLICATIONS

A. E. Siegmon, "Optical Resonators and Lens Waveguides," An Introduction to Lasers and Masers, Chapter 8, 1971, pp. 305–315.

* cited by examiner

Primary Examiner—Akm Enayet Ullah

(57) ABSTRACT

An optical switch, optical switching method, and a switched optical communication system include at least one micromirror in a path along which an optical signal propagates between first and second optical waveguides. Further provided is a refractive material through which the optical signal propagates. The refractive material has a refractive index greater than the refractive index of air. The refractive index of the refractive index may be less than or equal to a refractive index of the optical waveguides.

26 Claims, 8 Drawing Sheets

OPTICAL SWITCH WITH REDUCED BEAM DIVERGENCE

TECHNICAL FIELD

The technology disclosed herein generally relates to optical communications. More particularly, the technology disclosed herein relates to optical switches for switching optical signals from one of a group of input paths to one of a group of output paths.

BACKGROUND DESCRIPTION OF RELATED ART

FIG. 1 is a conceptual block diagram of a simplified prior art optical communication system 100 for exchanging information via optical signals. Multiple optical sources 110-1, 110-2, ..., 110-M provide optical signals along a corresponding number of input optical waveguides 120-1, 120-2, ..., 120-M. For example, the input optical waveguides 120 may consist of optical fibers or other light guiding structures. Shown in FIG. 1, the number of optical sources 110 and input optical waveguides 120 is M, which represents any positive integer. The optical signals from the respective optical sources 110 are transmitted by the input optical waveguides 120 to an optical switch 130.

The optical switch 130 redirects the optical signals to a number of output optical waveguides 140-1, 140-2, ..., 140-N (e.g., optical fibers). The optical signals are directed through the output optical waveguides 140 to a corresponding number of destination devices 150-1, 150-2, ..., 150-N that utilize the optical signals for a particular purpose. The destination devices 150 are not necessarily located near the optical switch 130. Instead, the optical communication system 100 may be configured such that the output optical waveguides 140 each have a length of several kilometers. With this configuration, the waveguides 140 may direct the optical signals to destination devices 150 located at great distances from the optical switch 130. The number N represents the number of output optical waveguides 140 and destination devices 150.

The optical switch 130 enables an optical signal that is received via any one of the M input optical waveguides 120 to be routed to any one of the N output optical waveguides 140. One embodiment of the optical switch 130 includes two input paths connected to two respective input optical waveguides 120 and two output paths connected to two respective output optical waveguides 140. This configuration is sometimes referred to as a 2×2 matrix or "cross-connect" optical switch. In practice, cross-connect optical switches may be configured with any number M of input paths and any number N of output paths, as is known in the art. In some cross-connect optical switches, the number of input paths is equal to the number of output paths, i.e., M=N. Optical signals propagate along controlled paths between the input paths and output paths of the optical switch 130. The paths may be established by operating moveable micro-mirrors to route the optical signals from the input paths to the respective chosen output paths.

FIG. 2 is a schematic diagram of one such prior art cross-connect optical switch 200 from U.S. Pat. No. 6,215,222 to Hoen (assigned at issuance to Agilent Technologies Inc.). The cross-connect optical switch 200 is shown as a 4×4 matrix optical switch and includes a number of switching devices 202 that can redirect optical signals when activated. Each switching device 202 includes a micro-mirror 204 that can be oriented to reflect an optical signal from one of the input optical waveguides on an input side 206 of the optical switch 200 to one of the output optical waveguides on an output side 208 of the optical switch 200.

A light beam exiting the end of each of the input optical waveguides 210, 212, 214, 216 (e.g., optical fibers) on the input side 206 is known to spread, or "diverge," with increasing distance away from the end of the waveguide. For light which is launched into free space, the beam will disperse in a generally conical pattern as described in Saleh et al., "Fundamentals of Photonics," Chapter 3 entitled "Beam Optics," (John Wiley & Sons 1991). The angular "beamwidth" ($\theta$) of the resulting conical radiation beam is often specified as an angle for which the cone includes a large percentage (often about 86%) of the total beam energy. The angular beamwidth $\theta$ is proportional to $\lambda/\omega_0$ and is approximately equal to $\lambda/\pi\omega_0$, where $\lambda$ is the wavelength of the light in the beam and $\omega_0$ is the radius of the beam at its origin (e.g., approximately the radius of the waveguide). The wavelength $\lambda$ is equal to $\lambda_o/n$ where $\lambda_o$ is the wavelength in free space (vacuum), and n represents the refractive index of the medium through which the beam propagates. When the refractive index n is larger, for example, the angular beamwidth $\theta$ is smaller. Since many optical communication systems are provided with relatively small diameter optical waveguides, and are operated at relatively long wavelengths, the angular beamwidth $\theta$ of the beams in their associated optical switches can be quite large.

Beam divergence leads to a wide variety of problems in optical communication systems. For example, beams having a large angular beamwidth $\theta$ are difficult to efficiently couple to other waveguides. Beam divergence is particularly significant for cross-connect optical switches in which divergent beams can spill over into surrounding channels and cause cross talk. Furthermore, large beams generally require larger mirrors, which are difficult and costly to manufacture and operate. Larger mirrors and their arrays also create longer optical transmission paths for the same port count, which further aggravates the problems associated with beam divergence.

Prior approaches to addressing the problem of beam divergence in optical switches have focussed on using collimators for converting the diverging light beams to parallel beams. For example, the optical switch 200 shown in FIG. 2 includes lenses 218 that are positioned between each input optical waveguide 210, 212, 214, 216 and the corresponding micro-mirrors 204. The lenses 218 on the input side 206 collimate optical beams output by the input optical waveguides 210, 212, 214, 216 and lens 218 on the output side 208 refocus the collimated beams onto the ends of output optical waveguides 220, 222, 224, 226 (e.g., optical fibers). However, the problems associated with beam divergence cannot be completely eliminated with lenses, and, until now, the prior art has failed to adequately consider other approaches for reducing the beam divergence in optical switches.

SUMMARY

The above-described drawbacks and other drawbacks of conventional technologies are addressed by providing an optical switch that includes an input optical waveguide, an output optical waveguide, and at least one micro-mirror located in the optical path along which an optical signal propagates from the input optical waveguide to the output optical waveguide. The at least one micro-mirror reflects the optical signal between the pair of optical waveguides. The optical switch additionally includes refractive material arranged in the optical path. The refractive material has a refractive index greater than the refractive index of air.

Also disclosed is an optical switching method in which a first optical waveguide, a second optical waveguide, and a refractive material are provided, the refractive material having a refractive index greater than a refractive index of air. An optical signal is propagated from the first optical waveguide through the refractive material. The optical signal is then reflected through the refractive material to the second optical waveguide.

In yet another embodiment, an optical communication system includes a first optical waveguide, a second optical waveguide, an optical source, an optical switch, and a destination device. The optical source transmits an optical signal via the first optical waveguide to the optical switch. The optical switch includes at least one micro-mirror and a refractive material having a refractive index greater than the refractive index of air. The refractive material fills the free space around the at least one micro-mirror. In the optical switch, the optical signal is propagated through the refractive material, reflected by the at least one micro-mirror, and propagated through the refractive material to the second optical waveguide. The optical signal propagates via the second optical waveguide to the destination device.

By providing an improved optical switch in which the regions of the conventional optical switch containing free space are replaced with a refractive material having a refractive index greater than air, beam divergence is significantly reduced. The reduction in beam divergence reduces, or even eliminates, the problem of cross talk experienced in prior art optical switches. Furthermore, the optical switch having a reduced beam divergence can incorporate smaller micro-mirrors than those needed in prior art optical switches. Thus, the manufacturing and operating costs of the optical switches of the invention are reduced.

BRIEF DESCRIPTION OF THE DRAWINGS

Various embodiments of the invention will now be described with reference to the following figures in which the reference numerals indicate the same features in each of the figures.

DETAILED DESCRIPTION OF THE PREFERRED EMBODIMENTS

Figure 2:
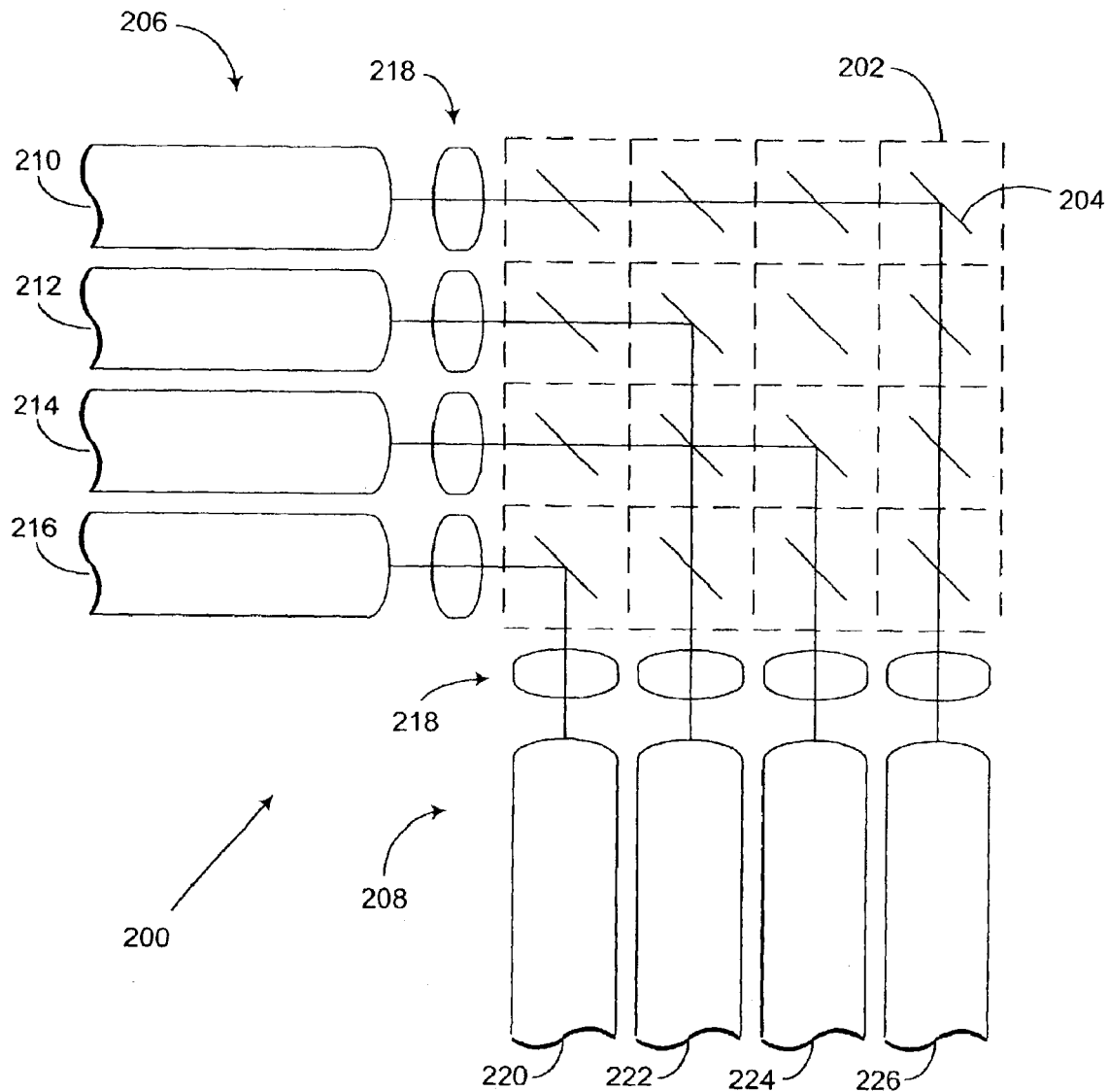
FIG. 2 is a schematic diagram of a conventional cross-connect optical switch used in the optical communication system shown in FIG. 1.
Figure 3:
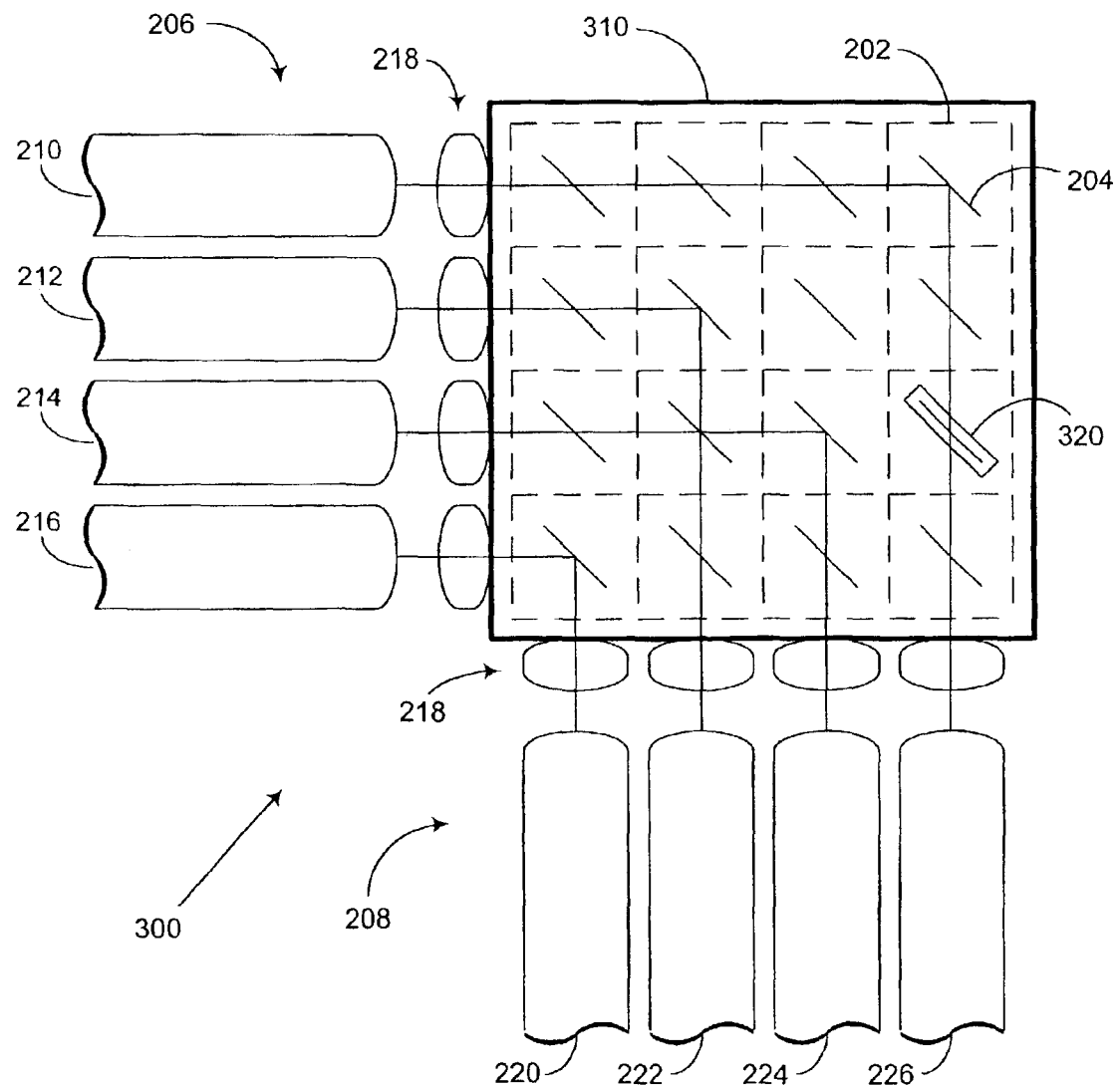
FIG. 3 is a schematic diagram of an embodiment of a cross-connect optical switch in accordance with the present invention.

FIG. 3 is an example of one embodiment of an improved cross-connect optical switch 300. Elements of optical switch 300 that correspond to elements of optical switch 200 are described above with reference to FIG. 2. The same elements are indicated by the same reference numerals and will not be described here. In addition to the common elements shown in FIG. 2, the optical switch 300 includes a refractive material 310 that fills the free space of the prior art optical switch 200. Optical signals propagate through the refractive material 310 from the input optical waveguides 210, 212, 214, 216, and are reflected by the activated micro-mirrors 204. The reflected optical signals further propagate through the refractive material 310 to the respective output optical waveguide 220, 222, 224, 226.

As shown in FIG. 3, the lenses 218 are positioned between the ends of the optical waveguides and the micro-mirrors 204. The lenses 218 are preferably positioned near or adjacent to an outside surface of the refractive material 310 to reduce the distance that the collimated light beam from the lenses 218 must travel through free space. In the case where the lenses 218 are positioned near the refractive material 310 with an air gap in between, the outside surface of the refractive material 310 preferably contains an anti-reflection coating (not shown) to account for the optical signals going from air, having a low refractive index, to the refractive material 310, having a higher refractive index. Also, the outside surfaces of the lenses 218 preferably contain anti-reflection coatings as well (not shown). In the case where the lenses 218 are positioned adjacent to the refractive material 310, the lenses 218 may be molded, for instance, onto the outside surface of the refractive material 310, with anti-reflection coatings on the exposed surfaces of the lenses 218.

The dimensions of the refractive material 310 may be extended to partially or completely surround the lenses 218. In the case where the lenses 218 are positioned completely within the refractive material 310, the refractive material 310 is selected such that its refractive index is less than the refractive index of the lenses 218. This difference in refractive indices allows the lenses 218 to properly collimate the optical signals. Otherwise, if the lenses 218 were positioned within the refractive material 310 having substantially the same refractive index, the lenses 218 would not be able to perform their intended function.

As used in this disclosure, the term "refractive material" will be taken to mean a material that has a refractive index greater than the refractive index of air. The refractive material 310 reduces the beam divergence of optical signals propagating between the lenses 218 on opposite ends of the optical switch 300 compared with propagation through free space. The refractive index of the refractive material 310 may be less than and is preferably equal to or approximately equal to the refractive index of the optical waveguides 210, 212, 214, 216, 220, 222, 224, 226 or lenses 218. For example, since air has a refractive index of about 1.0 and conventional optical fibers have a refractive index of about 1.45 to 1.7, the refractive index of the refractive material 310 is preferably between approximately 1.0 (for air) and 1.45 to 1.7 (for optical glass). Preferably, the refractive index is about 1.5. The refractive material 310 may also be self-guiding.

High-quality optical glasses with low-OH content may be used for the refractive material 310. Such glasses preferably have very low absorption and scatter over the operational wavelength range, typically around 1.25 to 1.6 µm, of the optical switch. However, a very low coefficient of thermal expansion and dispersion are also helpful. Suitable optical glasses are also available from a variety of suppliers including Schott Glass of Germany. One such optical glass is Schott's ZERODUR® brand glass, which also has a relatively low coefficient of thermal expansion in order to minimize thermal misalignment problems.

In this example in which the refractive material 310 is glass or other solid material, recesses 320 may be provided around the micro-mirrors 204 to facilitate movement of the micro-mirrors 204. The recesses 320 may be filled with a medium such as air, gas, liquid, or other suitable material that allows the micro-mirrors 204 within the recesses 320 to move freely. When the medium within the recesses 320 contains a refractive index that is different from the refractive index of the refractive material 310, the inside surfaces of the recesses 320 contain an anti-reflection coating (not shown) to account for the transition of the optical signals from one medium to another medium having a different index of refraction.

The refractive material 310 may alternatively be a fluid or a semi-solid, such as a gel. For example, various liquids having a refractive index of approximately 1.5 are commercially available from a variety of suppliers. In the case where the refractive material 310 is a fluid or semi-solid, a container (not shown) is used to confine the refractive material 310. The container has an outside surface that is preferably coated with an anti-reflection layer to reduce the reflection of light at the interface between air and the outside surface of the container.

One advantage of using non-solid materials as the refractive material 310 is that they may easily be arranged to completely displace air in the space around the micro-mirrors 204. Thus, with non-solid materials, the recesses 320 may not be needed, since non-solid materials do not typically interfere with the movement of the micro-mirrors 204. With these types of refractive materials, the free space within the recesses 320 that could otherwise cause beam divergence is eliminated. Without the need for recesses 320, another advantage of using non-solids is that the anti-reflection coatings that are typically needed for the inside surfaces or the recesses 320 are not required. Furthermore, some liquids may be self-guiding which further reduces divergence.

Figure 4:
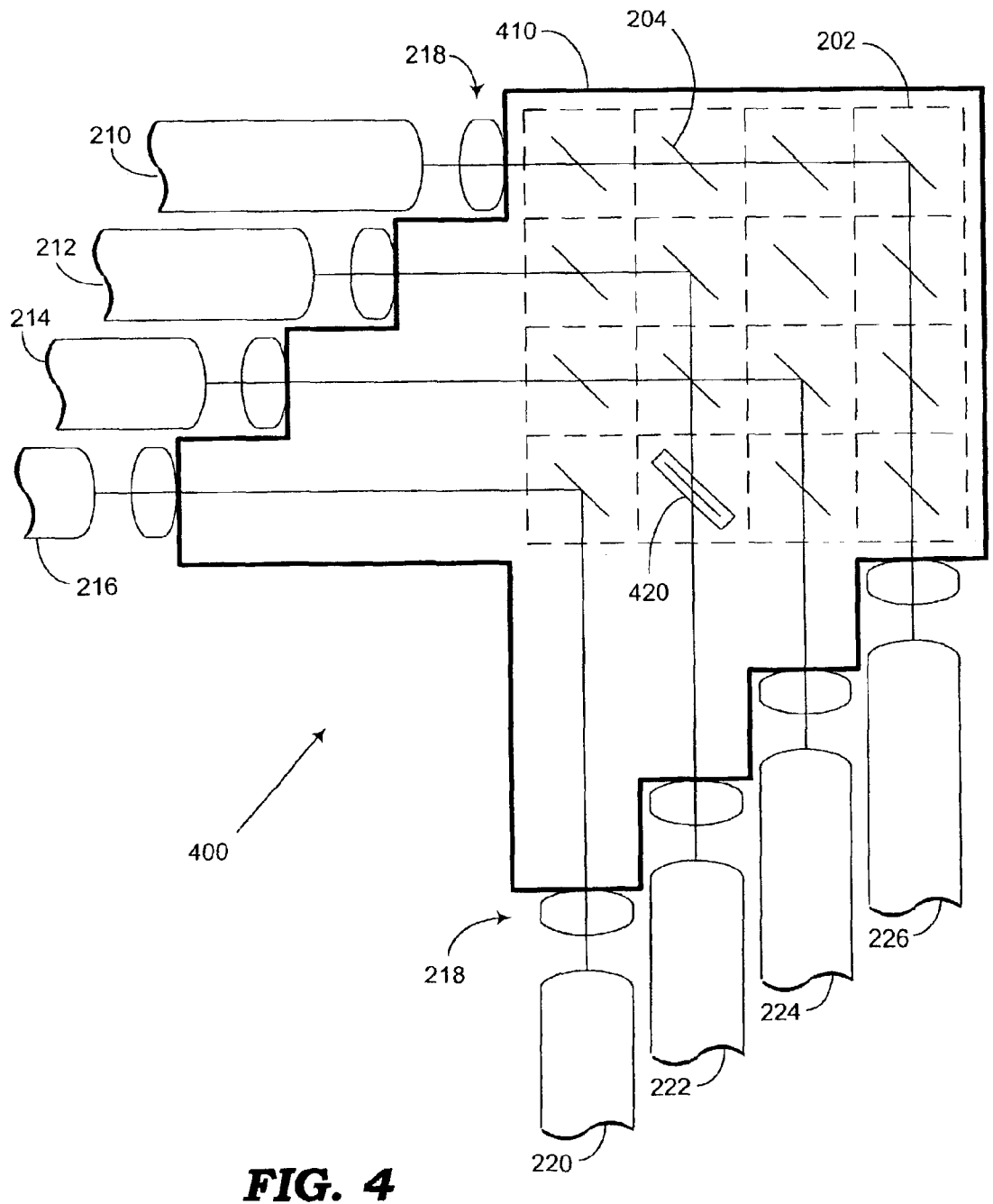
FIG. 4 is a schematic diagram of another embodiment of a cross-connect optical switch in accordance with the present invention.

FIG. 4 illustrates another exemplary embodiment of a cross-connect optical switch 400. The optical switch 400 includes a refractive material 410 having an increased size and a staggered shape as compared to the refractive material 310 shown in FIG. 3. The optical switch 400 is configured in this manner such that the distances that optical signals travel from the ends of the input optical waveguides 210, 212, 214, 216 to the ends of the output optical waveguides 220, 222, 224, 226 are approximately equal. As illustrated by the embodiment shown in FIG. 4, substantially the entire optical path between each corresponding pair of optical waveguides is provided with the refractive material 410.

The lenses 218 are likewise positioned in a staggered arrangement according to the shape of the refractive material 410 and located near, adjacent to, or within the refractive material 410. When the lenses 218 and the refractive material 410 are positioned with an air gap between them, the refractive material 410 is preferably configured with an anti-reflection coating on its outside surface to account for the optical signals travelling through the transition between air, having a low refractive index, and the refractive material 410, having a higher refractive index. When positioned adjacent to the refractive material 410, the lenses 218 may be molded onto the surface of the refractive material 410. In another case, the refractive material 410 may partially or completely surround the lenses 218. In the case of the refractive material 410 completely surrounding the lenses 218, the refractive material 410 preferably contains a refractive index that is less than the refractive index of the lenses 218 so that the lenses 218 are allowed to properly collimate the optical signals.

The shape of the refractive material 410 may be staggered as shown in FIG. 4 such that the arrangement of the optical waveguides are likewise staggered. The refractive material 410 is shaped accordingly to maintain a constant distance that an optical signal propagates through the refractive material 410, whereby the lengths of the optical paths from any input optical waveguide 210, 212, 214, 216 to any output optical waveguide 220, 222, 224, 226 are approximately equal.

The refractive material 410 may be a high-quality glass, such as Schott's ZERODUR® brand glass described above, or other solid material. Recesses 420, filled with air, gas, liquid, or other suitable material, may also be provided around the micro-mirrors 204 to facilitate movement of the micro-mirrors 204. The recesses 420 are needed when the refractive material 410 is a solid or other type of material that would otherwise interfere with the movement of the micro-mirrors 204. The inside surfaces of the recesses 420 preferably contain an anti-reflection coating (not shown) to account for the optical transition between mediums having different refractive indices.

Alternatively, the refractive material 410 may be a fluid or semi-solid, confined within a container (not shown). In this case, the container is shaped with the staggered shape and may have an anti-reflective coating on its outside surfaces. Similar to the embodiment of FIG. 3, the non-solid refractive material 410 may extend over the micro-mirrors 204 and completely displace air in the space around them. Thus, with the fluid or semi-solid refractive material 410, the need for recesses 420 is eliminated.

Figure 5:
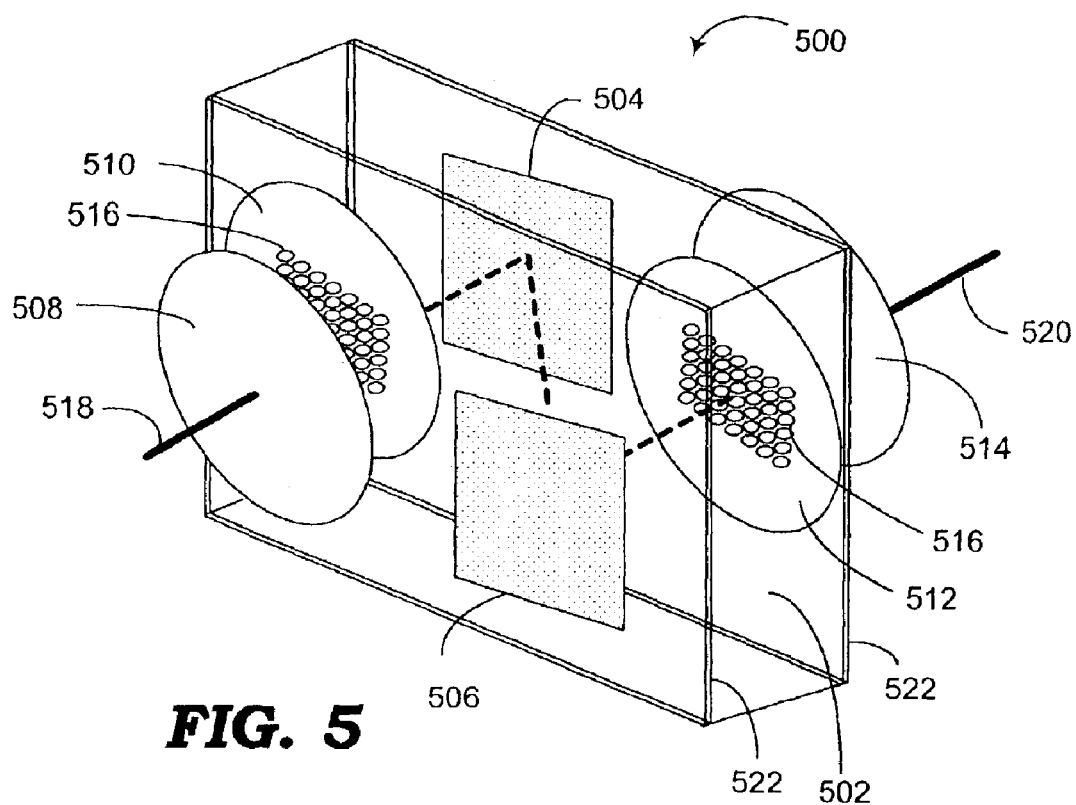
FIG. 5 is an isometric view of an embodiment of an optical switch in accordance with the present invention.

FIG. 5 is an isometric view of another embodiment of an optical switch 500 including an optical glass refractive material 502. In contrast to the cross-connect optical switches 300 and 400 shown in FIGS. 3 and 4, respectively, the optical switch 500 contains two micro-mirror arrays that replace the matrix arrangement of micro-mirrors 204. A first micro-mirror array 504 and a second micro-mirror array 506 are arranged on opposite sides of the optical glass refractive material 502. Each of the micro-mirror arrays 504 and 506 includes a plurality of micro-mirrors (not shown). The micro-mirrors of the micro-mirror arrays 504 and 506 are steerable in three dimensions to control the orientation of the micro-mirrors so that the optical signals are reflected along a selected path.

A first fiber array positioner 508 and a first lens array 510 are arranged on one side of the optical glass refractive material 502. A second lens array 512 and a second fiber array positioner 514 are arranged on the opposite side of the optical glass refractive material 502. Each of the lens arrays 510 and 512 includes a plurality of lenses 516. Fiber array positioners 508 and 514 stably position optical fibers aligned with the respective lenses 516 in the lens arrays 510 and 512. Exemplary optical fibers in optical communication with each other are shown at 518 and 520.

For example, these and other components of the optical switch 500 may be precisely mounted on a mounting member as described in U.S. Pat. No. 5,848,211 to Yang et al. (assigned at issuance to Hewlett-Packard Company). Additionally, the use of an apertured positioner is described in U.S. Pat. Ser. No. 09/968,378, entitled "Precisely Configuring Optical Fibers And Other Optical Elements Using An Apertured Wafer Positioner," filed Oct. 1, 2001. The optical glass refractive material 502 may also be provided with an anti-reflection coating 522 on at least one of its surfaces.

Figure 6:
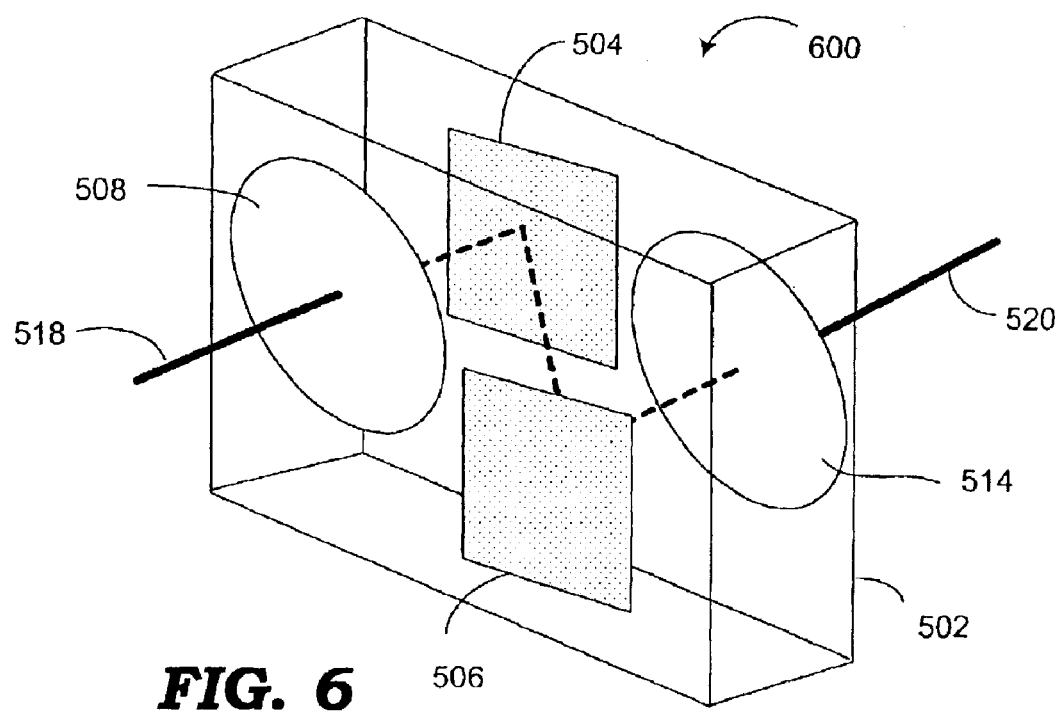
FIG. 6 is an isometric view of another embodiment of an optical switch in accordance with the present invention.

Although only one optical fiber 518 is shown in the first fiber array positioner 508 in FIGS. 5 and 6, the first fiber array positioner 508 will typically include an optical fiber (or other optical waveguide) corresponding to each particular lens 516 in the first lens array 510. Likewise, the second fiber array positioner 514 typically includes an optical fiber corresponding to each particular lens 516 in the second lens array 512. Anti-reflection coatings may also be deposited on the end surfaces of the fibers, examples of which are shown at 518 and 520.

Operation of the optical switch 500 to direct an optical signal from optical fiber 518 to optical fiber 520 will now be described. The optical signal is launched from the optical fiber 518 located in the first fiber array positioner 508. The optical signal is launched into free space toward a lens 516 in the first lens array 510 corresponding to optical fiber 518. Alternatively, instead of free space, a refractive material, having a refractive index different from the refractive index of the lenses 516 of the first lens array 510, may be placed between the first fiber array positioner 508 and the first lens array 510.

As indicated by the dashed line in FIG. 5, the optical signal collimated by the lens 516 corresponding to optical fiber 518 passes through the optical glass refractive material 502. The optical signal is reflected by the micro-mirror of the first micro-mirror array 504 corresponding to optical fiber 518 and propagates back through the optical glass refractive material 502. The optical signal is then reflected by one of the micro-mirrors of the second micro-mirror array 506 back again through the optical glass refractive material 502. The optical signal propagates through the lens 516 of the second lens array 512 corresponding to optical fiber 520. The lens 516 of the second lens array 512 refocuses the beam on the end of the receiving optical fiber 520 positioned in the second fiber array positioner 514.

In FIG. 5, the micro-mirror arrays 504, 506 and/or lens arrays 510, 512 are preferably arranged as close to the optical glass refractive material 502 as possible in order to minimize the length of the optical transmission path through free space. Much of the free space in the optical transmission path between the optical glass refractive material 502, micro-mirror arrays 504, 506, lens arrays 510, 512, and fiber array positioners 508, 514 may be filled with a suitable refractive material to further reduce beam divergence. Any refractive material surrounding the lenses of the lens arrays 510, 512 has a refractive index different from the refractive index of the lenses to allow the lenses to properly collimate and focus.

In an alternative configuration, the lens arrays 510, 512 may be formed directly on or below the surfaces of the optical glass refractive material 502. When the lens arrays 510, 512 are positioned completely within the optical glass refractive material 502, the refractive index of the lenses of the lens arrays 510, 512 is different from the refractive index of the optical glass refractive material 502. This mounting arrangement helps minimize the effects of thermal drift and also makes the optical switch 500 more compact.

As shown in FIG. 6, an alternative embodiment of an optical switch 600 is provided. This embodiment is a simplified version of the embodiment of FIG. 5 and has the same configuration except that it is formed without lens arrays 510, 512. This embodiment lacks the lens arrays 510, 512 since propagation of the beams through the optical glass refractive material 502 reduces much of the divergence of the beam.

Figure 7:
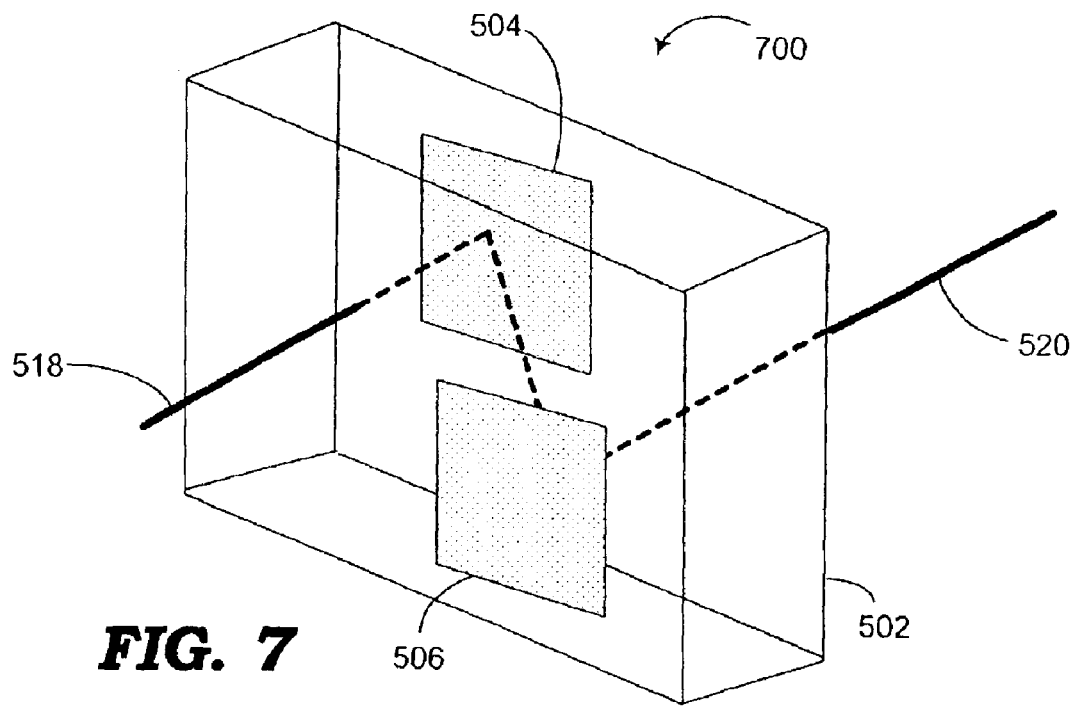
FIG. 7 is an isometric view of yet another embodiment of an optical switch in accordance with the present invention.

FIG. 7 shows another embodiment of an optical switch 700 and is a simplified version of the embodiments shown in FIGS. 5 and 6. In this arrangement, the ends of the optical fibers 518, 520 are located juxtaposed to the optical glass refractive material 502 without the use of the fiber array positioners 508, 514 shown in FIGS. 5 and 6. The ends of the optical fibers 518, 520 may be attached directly to the optical glass refractive material 502. If the micro-mirror arrays 504, 506 and fibers 518, 520 are isolated from vibration, the optical switch 700 may operate without active pointing control that is typically required with optical switches to achieve a pointing accuracy within an acceptable range.

The technology described in copending U.S. patent application Ser. No. 10/104,193 filed on Mar. 21, 2002 for an "Optical Switching Fabric With an Optical to Electrical Converter in the Output Plane," may be used in combination with the optical switch 700 to minimize or eliminate the requirement for active pointing control. Active pointing control may not be as necessary in this situation because, in a terminating switch, the output needs to hit a target having a diameter of approximately 35 $\mu$m, rather than the 1 $\mu$m approximate diameter size of a single mode optical waveguide core. Control, if necessary, may be further simplified by the different channels drifting together to a certain extent.

Figure 8:
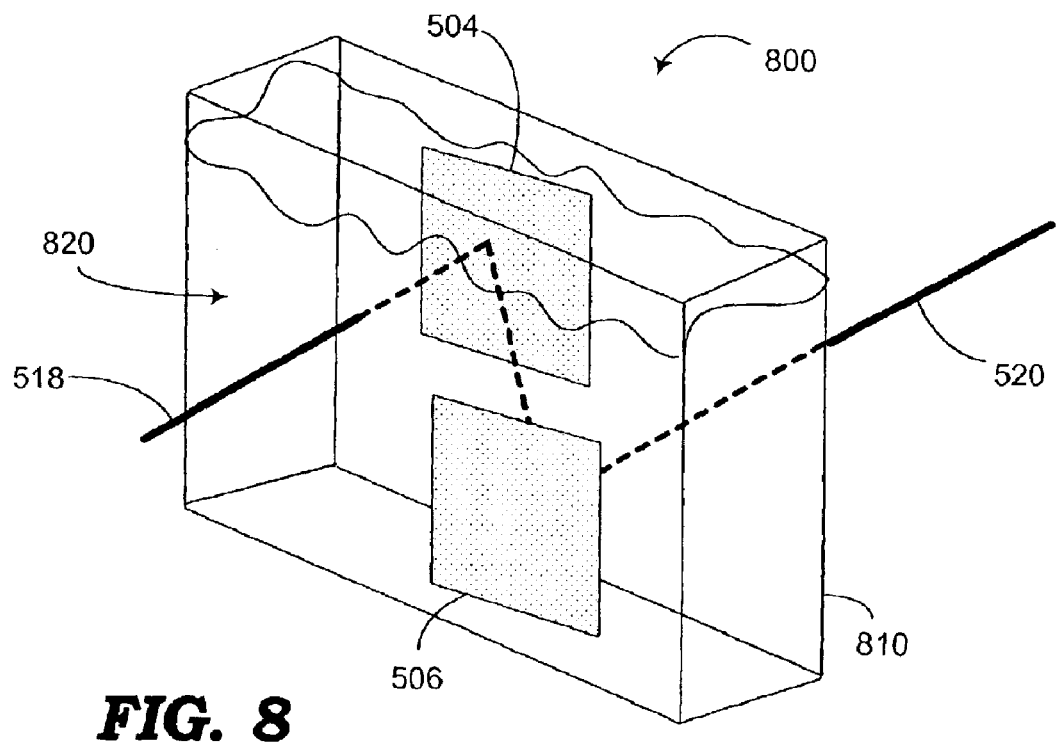
FIG. 8 is an isometric view of yet another embodiment of an optical switch in accordance with the present invention.

In FIG. 8, yet another embodiment of an optical switch 800 is illustrated. The optical glass refractive material 502 shown in FIGS. 5–7 has been replaced with a transparent container 810 that contains a fluid refractive material 820. The fluid refractive material 820 may constitute a liquid, semi liquid, gel, gas or any combination thereof. Some or all of the refractive material of the optical glass refractive material 502 shown in FIGS. 5–7 may be replaced by a liquid, semi-liquid gel, gas or other material, having a suitably high index of refraction.

Figure 1:
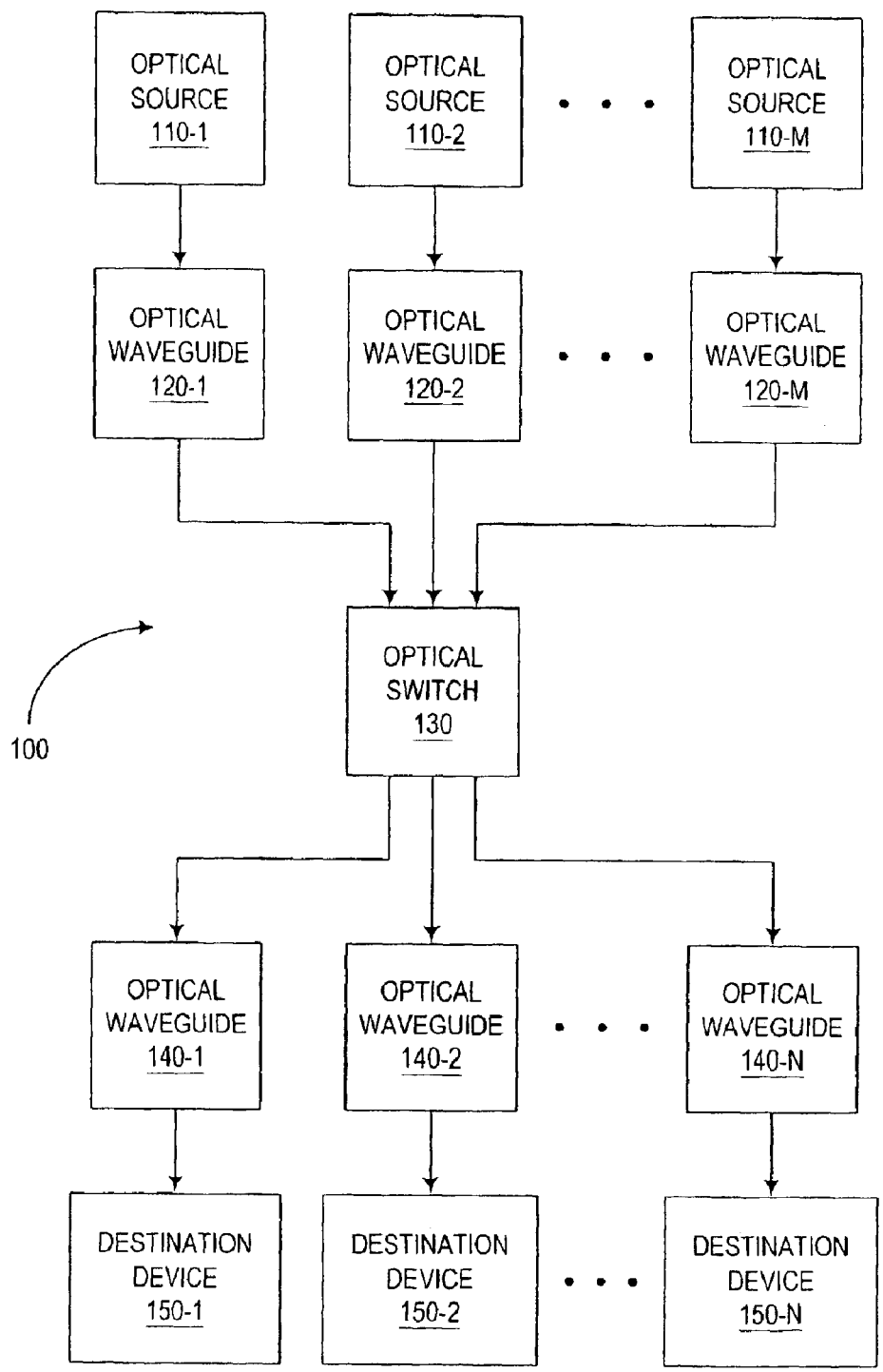
FIG. 1 is a simplified block diagram of a conventional optical communication system.
Figure 9:
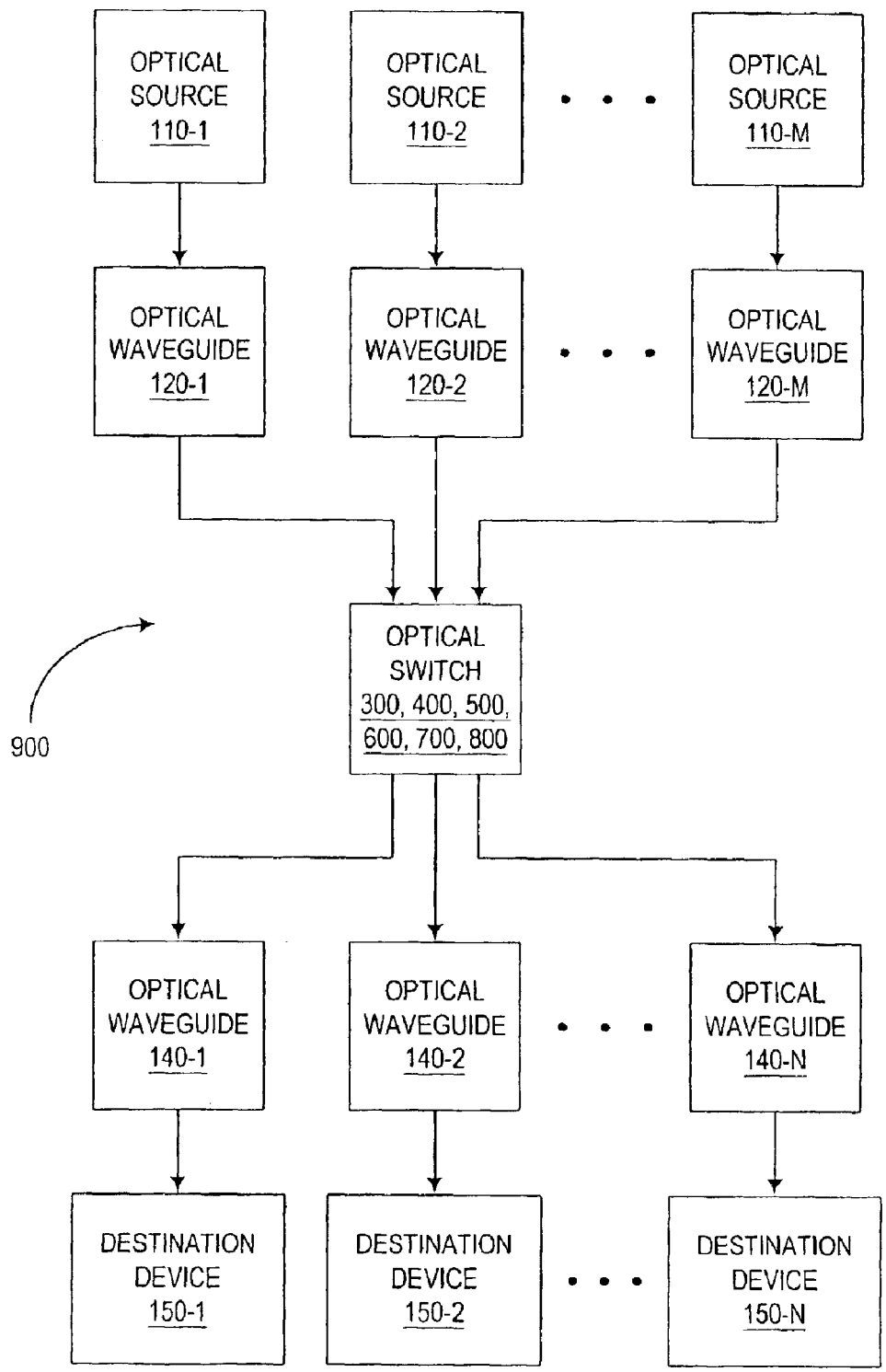
FIG. 9 is a simplified block diagram of an optical communication system including any one of the switches shown in FIGS. 3–8.

Any, or all, of the switches 300, 400, 500, 600, 700, and 800 may be utilized to provide an improved optical communication system 900 as shown in FIG. 9. The improved communication system 900 is substantially the same as the communication system 100 shown in FIG. 1, except that the conventional optical switch 130 is replaced with one of the improved optical switches 300, 400, 500, 600, 700, or 800. The communication system 900 may further be provided with the improved optical switches in a variety of other locations where switching is required. The optical switches 300, 400, 500, 600, 700, and 800 may replace any conventional optical switch or switches within existing optical systems. The optical switches 300, 400, 500, 600, 700, and 800 help reduce beam divergence thereby allowing optical signals from input optical waveguides to be more efficiently coupled to their associated output optical waveguides. Furthermore, the reduced beam divergence of the improved optical switches reduces cross talk inside the optical switches. Consequently, switching loss is reduced. The optical switches 300, 400, 500, 600, 700, and 800 may also be provided with smaller micro-mirrors, thus allowing for increased speed and reduced cost.

Figures 10, 11:
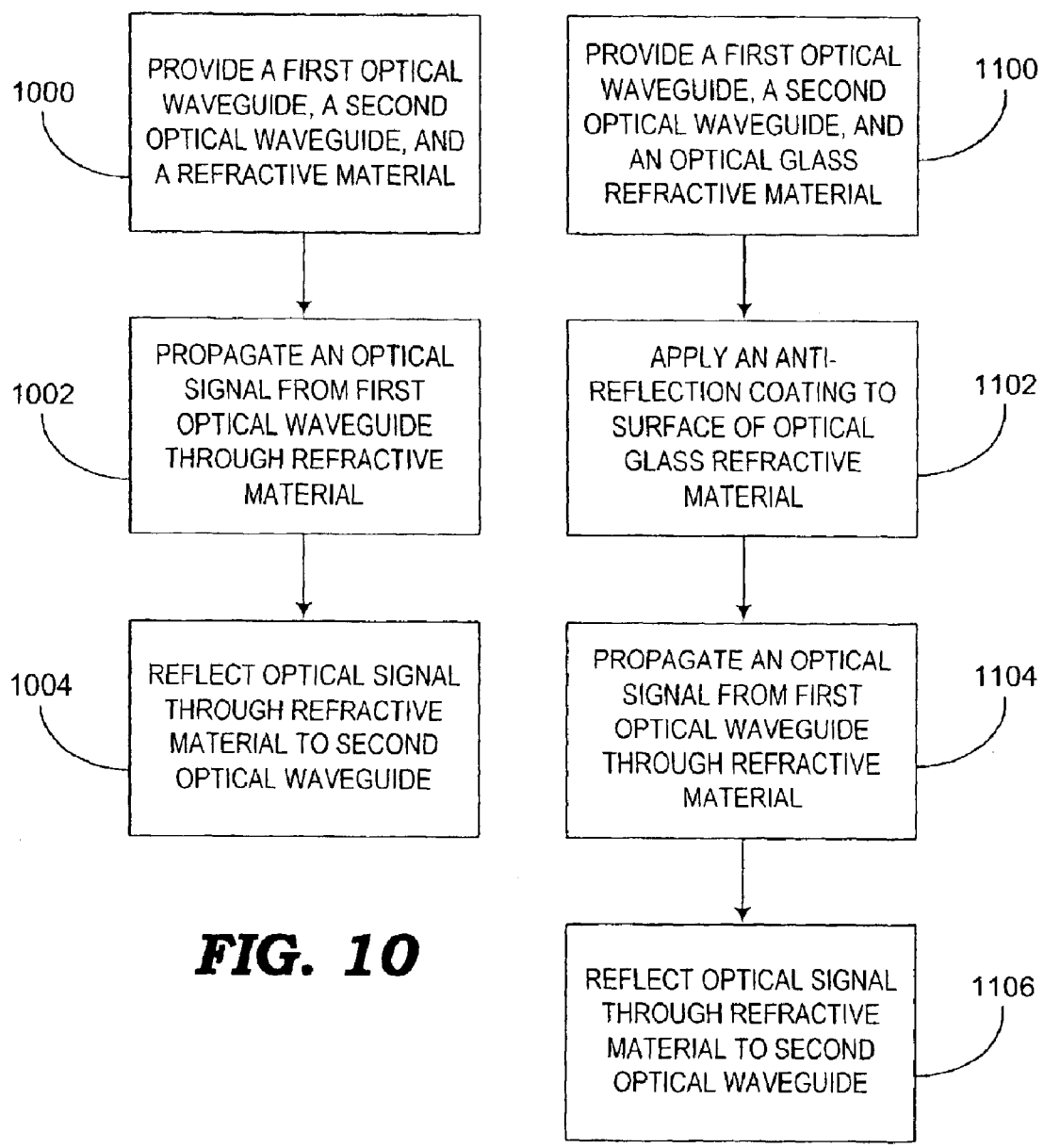
FIG. 10 is a flow chart of an embodiment of an optical switching method in accordance with the present invention.
FIG. 11 is a flow chart of another embodiment of an optical switching method in accordance with the present invention.

FIG. 10 is a flow chart illustrating an embodiment of a method for optically switching an optical signal from one optical waveguide to another. In block 1000, a first optical waveguide, a second optical waveguide, and a refractive material are provided. The refractive material is provided with a refractive index greater than the refractive index of air. In block 1002, an optical signal is propagated from the first optical waveguide through the refractive material. In block 1004, the optical signal is reflected through the refractive material to the second optical waveguide.

FIG. 11 is a flow chart illustrating another embodiment of an optical switching method. In block 1100, a first optical waveguide, a second optical waveguide, and an optical glass refractive material are provided. In block 1102, an anti-reflection coating is applied to the surface of the optical glass refractive material. In block 1104, an optical signal is propagated from the first optical waveguide through the optical glass refractive material. In block 1106, the optical signal is reflected through the refractive material to the second optical waveguide.

It should be emphasized that the embodiments described above, and particularly any "preferred" embodiments are merely examples of various implementations that have been set forth herein in order to provide a clear understanding of various aspects of the invention. One of ordinary skill in the art will be able to modify these embodiments without substantially departing from the scope of protection defined solely by a proper interpretation of the following claims.

What is claimed is:

1. An optical switch, comprising:
    an input optical waveguide;
    an output optical waveguide;
    at least one micro-mirror in an optical path along which an optical signal propagates from the input optical waveguide to the output optical waveguide; and
    a refractive material arranged in the optical path along which the optical signal propagates, the refractive material having a refractive index greater than the refractive index of air.

2. The optical switch recited in claim 1, wherein the refractive index of the refractive material is approximately equal to the refractive index of one of the input optical waveguide and output optical waveguide.

3. The optical switch recited in claim 1, wherein the refractive index of the refractive material is between 1.0 and 1.7.

4. The optical switch recited in claim 3, wherein the refractive index of the refractive material is about 1.5.

5. The optical switch recited in claim 1, wherein the orientation of the at least one micro-mirror is controlled three dimensionally.

6. The optical switch recited in claim 1, wherein the refractive material comprises a fluid that immerses the at least one micro-mirror.

7. The optical switch recited in claim 6, wherein the fluid is a liquid that has a refractive index of approximately 1.5.

8. The optical switch recited in claim 1, wherein the refractive material comprises optical glass.

9. The optical switch recited in claim 8, wherein a surface of the optical glass is coated with an anti-reflection coating.

10. The optical switch recited in claim 1, further comprising a plurality of lenses positioned between the optical waveguides and the refractive material.

11. The optical switch recited in claim 10, wherein the lenses are positioned on the surface of the refractive material.

12. An optical switching method, comprising:
    providing a first optical waveguide, a second optical waveguide, and a refractive material having a refractive index greater than the refractive index of air;
    propagating an optical signal from the first optical waveguide through the refractive material; and
    reflecting the optical signal through the refractive material to the second optical waveguide.

13. The method recited in claim 12, wherein the providing a refractive material comprises providing a material having a refractive index that is not greater than the refractive index of the first and second optical waveguides.

14. The method recited in claim 12, wherein the providing a refractive material comprises providing a material having a refractive index that is greater than the refractive index of the first and second optical waveguides.

15. The method recited in claim 12, wherein providing a refractive material comprises providing a material having a refractive index between 1.0 and 1.7.

16. The method recited in claim 12, wherein providing a refractive material comprises providing a liquid.

17. The method recited in claim 16, wherein providing a liquid further comprises providing a liquid having a refractive index of approximately 1.5.

18. The method recited in claim 12, wherein providing a refractive material comprises providing an optical glass.

19. The method recited in claim 18, further comprising applying an anti-reflection coating to a surface of the optical glass.

20. An optical communication system, comprising:
    a first optical waveguide;
    a second optical waveguide;
    an optical source for transmitting an optical signal through the first optical waveguide;
    an optical switch including at least one micro-mirror and a refractive material having a refractive index greater than the refractive index of air, the refractive material filling the free space around the at least one micro-mirror, whereby the optical signal is propagated from the first optical waveguide through the refractive material, reflected by the at least one micro-mirror, and propagated through the refractive material to the second optical waveguide; and
    a destination device for receiving the optical signal from the second optical waveguide.

21. The optical communication system recited in claim 20, wherein the refractive index of the refractive material is not greater than the refractive index of the first and second optical waveguides.

22. The optical communication system recited in claim 20, wherein the refractive index of the refractive material is between 1.0 and 1.7.

23. The optical communication system recited in claim 20, wherein the refractive material includes a fluid.

24. The optical communication system recited in claim 23, wherein the fluid is a liquid that has a refractive index of approximately 1.5.

25. The optical communication system recited in claim 20, wherein the refractive material includes optical glass.

26. The optical communication system recited in claim 25, wherein a surface of the optical glass is coated with an anti-reflection coating.

* * * * *